United States Patent
Amtmann

(10) Patent No.: US 7,584,322 B2
(45) Date of Patent: Sep. 1, 2009

(54) METHOD FOR STORING AND/OR CHANGING STATE-INFORMATION OF A MEMORY AS WELL AS INTEGRATED CIRCUIT AND DATA CARRIER

(75) Inventor: Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 287 days.

(21) Appl. No.: 10/577,519

(22) PCT Filed: Oct. 27, 2004

(86) PCT No.: PCT/IB2004/052217

§ 371 (c)(1),
(2), (4) Date: Apr. 26, 2006

(87) PCT Pub. No.: WO2005/043457

PCT Pub. Date: May 12, 2005

(65) Prior Publication Data

US 2007/0168623 A1   Jul. 19, 2007

(30) Foreign Application Priority Data

Oct. 31, 2003   (EP) .................................. 03104043

(51) Int. Cl.
*G06F 13/00* (2006.01)
*G06F 13/28* (2006.01)
*G06F 12/00* (2006.01)

(52) U.S. Cl. ...................................... 711/102; 710/200
(58) Field of Classification Search ................. 711/102; 710/200

See application file for complete search history.

(56) References Cited

U.S. PATENT DOCUMENTS 5,504,701 A * 4/1996 Takahashi et al. ...... 365/185.04
2003/0098495 A1   5/2003 Amo et al.

FOREIGN PATENT DOCUMENTS

EP   1 286 356   2/2003
WO   WO 99/65168   12/1999

* cited by examiner

*Primary Examiner*—Matt Kim
*Assistant Examiner*—Edward J Dudek

(57) ABSTRACT

In a method for storing and/or changing state information in a memory (2) containing a plurality of memory cells (3), wherein the memory cells (3) assume an irreversible memory state as a result of a programming step, wherein the state information is represented by a number and/or position of memory cells (3) that are in an irreversible memory state or are programmed, the state information (S3, S13) is determined by checking the memory state of the memory, and then, after selecting (S4, S14) an unprogrammed memory cell (3) the selected memory cell is programmed during or for changing the state information of the memory (2).

11 Claims, 3 Drawing Sheets

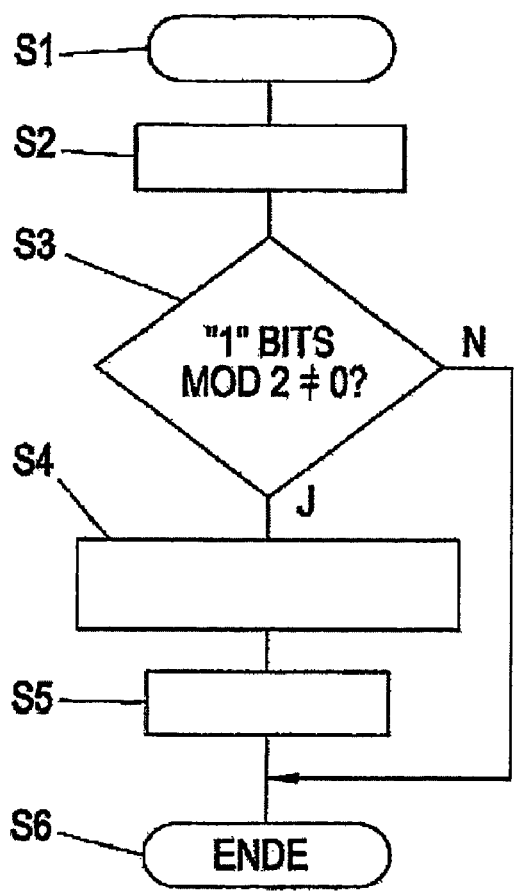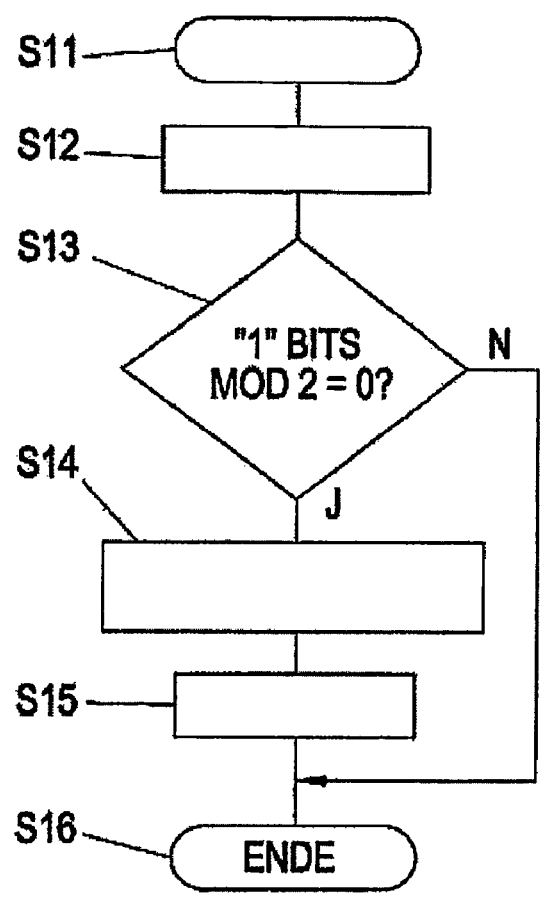
FIG. 1a   FIG. 1b
Fig.1

METHOD FOR STORING AND/OR CHANGING STATE-INFORMATION OF A MEMORY AS WELL AS INTEGRATED CIRCUIT AND DATA CARRIER

The invention relates to a method for storing and/or changing at least one state information item in a memory.

The invention further relates to an integrated circuit, which contains a memory of said kind, and to a data carrier, which contains an integrated circuit of said kind.

In connection with the marking of objects or products, application of a tag or label to such products is known. Serial numbers and/or manufacturing details relating to the production of the product and/or possibly sale-specific details, such as data relating to the seller and/or buyer are, for example, stored on the tag. It is desirable that a tag of this kind should not be readable by unauthorized persons after purchase of said product and for example after leaving a store. One possible way of preventing said reading is physical destruction of the tag or deactivation by sending a blocking command to the tag, so that following reception and evaluation of the blocking command the tag can no longer be read. A disadvantage with said deactivation is that, for example, if there are subsequent complaints, it is no longer possible to read or activate the tag again, so consideration was given to putting said tag in a special state, in which reading of the tag by unauthorized persons is impossible, but reading becomes possible again as a result of special activation by authorized agencies and/or persons. In this connection, it is known for example for a memory that contains said data relating to the product and/or its manufacture and/or possibly additional data relating to a sale and/or buyer, to be combined with a non-volatile memory, for example an EEPROM, it being possible for the non-volatile memory to be put into an appropriate state in which for example after leaving a store it is no longer possible to read the tag, but an authorized agency, for example a manufacturer, in the case of servicing or a complaint, can return the non-volatile memory to a state in which it is possible to read the data contained on the tag. A method of this kind is known for example from patent document WO 99/65168.

In this known method or in this known device it has proved to be a disadvantage that provision of said non-volatile memory, for example an EEPROM, is associated with comparatively high costs. In contrast, memory cells exist which, in an OTP (one time programmable) process, can only be programmed once and can no longer be changed, and are much less expensive than non-volatile memories, for example an EEPROM, though when using OTP memory cells of this kind the aforementioned disadvantages arise, that once a tag or label has been canceled it can no longer be read or reactivated.

The object to be achieved by the invention is to remedy the aforementioned disadvantages and provide an improved method and an improved integrated circuit and an improved data carrier.

To achieve the aforementioned object, a method for storing and/or changing a state information item in a memory containing a plurality of memory cells, wherein the memory cells assume an irreversible memory state as a result of a programming step, wherein the state information is represented by a number and/or position of memory cells existing or programmed in an irreversible memory state, said method comprising the steps presented in the following, namely determining the state information by checking the memory state of the memory and selecting an unprogrammed memory cell and programming the selected memory cell during and/or for changing the state information of the memory.

To achieve the aforementioned object, an integrated circuit contains for storing and/or changing status information of a memory containing a plurality of memory cells, wherein the memory cells assume an irreversible memory state as a result of a programming step, a programming unit for programming the memory cells and a feed-logic circuit, said feed-logic circuit being provided for pick-up and delivery of data for programming and for determining the state information of the memory.

To achieve the aforementioned object, a data carrier contains an integrated circuit having the form defined in the preceding paragraph.

As a result of the features according to the invention, a data carrier, for example tag or label, that is located on a product or object, enters a state in a simple and cost-effective way, which state prevents unauthorized reading of data, wherein by programming a selected memory cell for changing the state information of the memory by an authorized agency the data carrier can be returned to a state in which access to the data present on the data carrier is possible. By using a plurality of memory cells, which assume an irreversible state through a programming step employing an OTP process, a cost saving is made relative to use of a non-volatile memory, for example an EEPROM, on account of memory cells of simple structure, which assume an irreversible memory state through a programming step, wherein as a result of the plurality of memory cells, which are programmable only once and can no longer be changed, not only the same security requirements are made as when a non-volatile memory is used, but also a multiple change of the memory state of the state information of the memory is possible.

According to the measures of claims 2 and 8 the advantage is obtained that for additionally increasing security before determining the state information of the memory and subsequent programming of a selected, unprogrammed memory cell, verification regarding the authorization of access to the memory and hence change of the state information is made possible. With this verification of access authorization, at the same time verification or adjustment can be undertaken, so that, if necessary, differently authorized agencies have access to different data areas of a data carrier according to the invention.

According to the features of claims 3 and 7, a simple possibility is provided for determining the state information of the memory as well as the position of an unprogrammed memory cell for a subsequent change of the state information of the memory. The memory state of the plurality of memory cells, which assume an irreversible memory state as a result of a programming step, can be changed in, such a way that during programming of each selected memory cell a respective bit is changed from a "0" state to a "1" state, so that when the serial output of the memory is applied to a counter or a toggle flip-flop, it is a simple matter to determine the number of memory cells that are in a "1" state, so that the state information of the memory can be determined or derived directly from the result found for the number of memory cells that are in the "1" state. Similarly, with said counter or toggle flip-flop, the position of a next unprogrammed memory cell can also be found directly. The memory state of the memory is then determined in a particularly simple manner by using a toggle flip-flop, which toggles at the output whenever there is a "1" state at the input.

A memory state of the plurality of memory cells that assume an irreversible memory state as a result of a programming step can, however, also be changed by transposing an appropriate bit from a "1" state to a "0" state during programming of each selected memory cell.

According to the features of claim 4, it is a simple matter to determine the timing pulse at which the first memory cell with the "0" state appears or has appeared, so that this bit or this unprogrammed memory cell that has been determined represents directly the selected memory cell for changing the state information.

According to the features of claim 6, an integrated circuit is provided that is particularly simple and can be manufactured in a cost-effective way.

According to the features of claim 9, in addition to the proposed change, according to the invention, of the state information or of the memory state of a memory, it becomes possible to include a large number of further data in an integrated circuit according to the invention, as has already been presented several times above in connection with tags or labels of a product or object.

According to the features of claim 11, a simple use of a data carrier according to the invention is provided, employing known devices in connection with the marking or coding of objects or products by applying a tag or label.

The invention is described below on the basis of an embodiment illustrated in the drawings, but the invention is not limited to this.

FIG. 1 shows flow charts in connection with determination of the state information of a memory and programming of a memory cell according to a method according to the invention, where FIG. 1a shows a flow chart of a sequence for resetting a chip or memory from a "quiet" state according to the inventive method and FIG. 1b shows a flow chart of a sequence of setting a memory into a quiet state.

FIG. 1 shows schematically flow charts in connection with determination of the state information of a memory and the programming of a selected memory cell of the memory for changing the state information of the memory, the construction of said memory being explained below, with reference to FIGS. 2 and 3.

Figure 2:
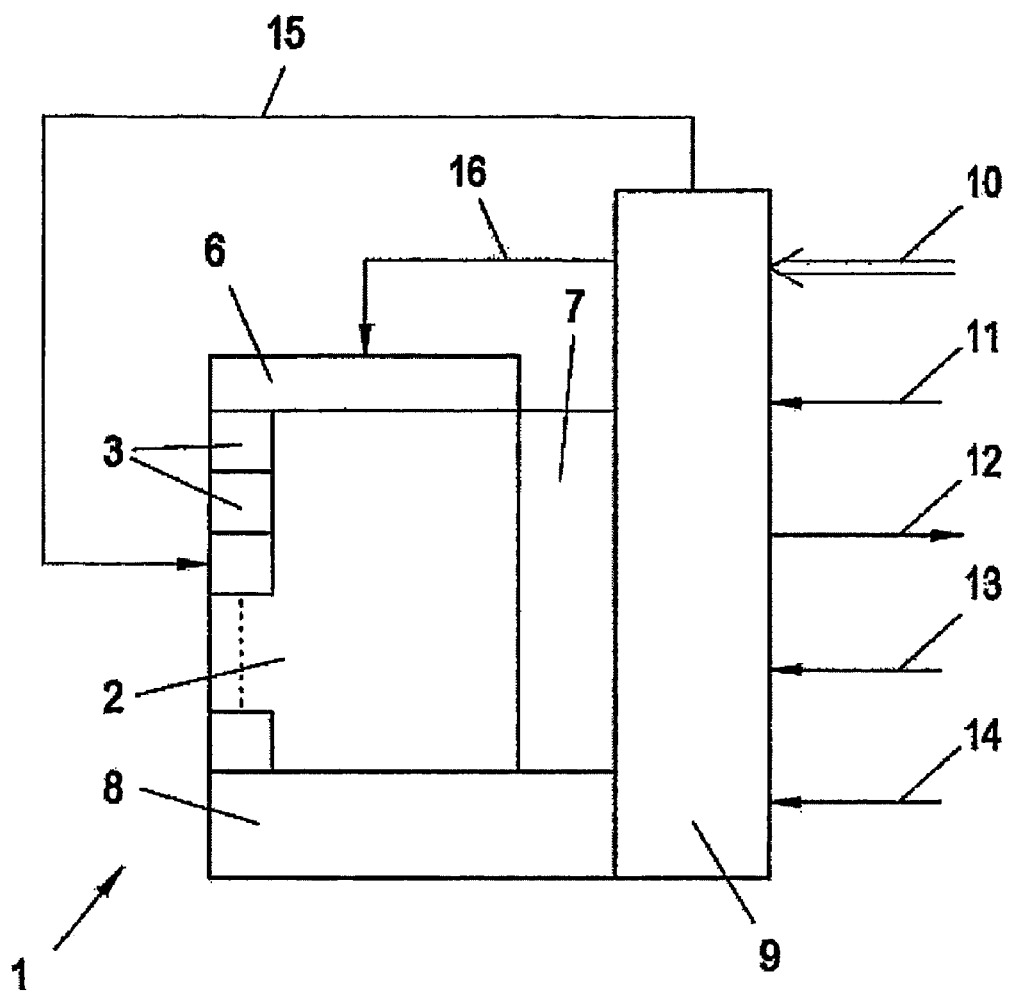
FIG. 2 shows, schematically, a memory-with a plurality of memory cells for carrying out the method according to the invention.
Figure 3:
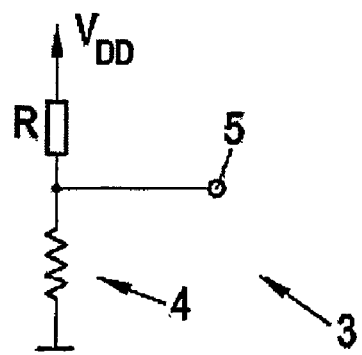
FIG. 3 shows a schematic representation of a once-programmable memory cell for use in a memory according to FIG. 2.

As shown in FIG. 2, in a memory 2 for reversible setting or establishing of a quiet state, a plurality of memory cells 3 is provided, each of said memory cells 3 representing one bit. In the present case the quiet state is represented by ten (10) memory cells 3, i.e. ten (10) bits. Said memory cell 3 is shown in FIG. 3. Each memory cell 3 is thus constructed as a so-called OTP (one time programmable) cell, and thus assumes, after a programming step, an irreversible memory state. Starting from a memory state in which all memory cells 3 or bits representing the quiet state are in a "0" state, on first setting a quiet state, a first bit is set, so that in the present case of ten (10) bits the following bit pattern is obtained for the state information of the quiet state of memory 2 or chip: "1000000000".

Said memory 2 is, as explained in more detail below, contained in a data carrier. In order to return such a data carrier with such a memory 2 or chip to a state in which other data contained in the data carrier can be read, it is necessary to reset the quiet state, determining a memory cell 3 that is to be programmed subsequently, as is explained in detail with reference to FIG. 4. After a programming of a selected unprogrammed memory cell 3, the following bit pattern is obtained for the state information of the quiet state of memory 2: "1100000000", so that the memory 2 or the associated chip or data carrier is no longer in the quiet state, but in a non-quiet state, namely active state, and consequently a replying or reading can be performed again.

After said replying or reading, deactivation must be provided to prevent unauthorized access. For this purpose, after a further determining of the state information and a further selecting of a next unprogrammed memory cell 3, a further programming to the quiet state is carried out, so that the following bit pattern is obtained as recent state information of the quiet state: "1110000000".

When two different states are provided as in the present case—namely the quiet state and the non-quiet state, in accordance with the above example an odd number of "1" states thus signifies that the memory 2 or chip is in the quiet state, and an even number of "1" states signifies that the memory 2 or chip is in the non-quiet state, i.e. is in an active mode.

The establishing or determining of the quiet state or of the active mode and a programming of a selected memory cell 3 for changing the state information is shown in detail in the flow charts according to FIG. 1.

The flow chart according to FIG. 1a shows a sequence for resetting a quiet state or assuming the active mode, said sequence starting at a block S1. At a next block S2 the state information of the memory state of memory 2 is read or determined, i.e. in the present case reading of the ten (10) bits that are provided for the quiet state. At a next block S3, verification is carried out as to whether there is an odd number of "1" states of the read bit. If the verification at block S3 is positive, corresponding, in accordance with the foregoing, to the quiet state of the memory 2 or of the chip containing memory 2, a selecting of a next unprogrammed memory cell 3 takes place at a next block S4, and then a programming of the selected memory cell 3 for changing the state information of memory 2 takes place at a next block S5. Thus, memory 2 or the data carrier containing memory 2 is in an active state at a next block S6.

If the verification at block S3 proves negative, the sequence is continued immediately after block S5, because in such a case memory 2 is already in the active mode.

Similarly, FIG. 1b shows a flow chart for a sequence for setting or establishing a quiet state, said sequence starting at a block S11. At a next block S12 reading of the memory state or determining of the state information again takes place, and according to a next block S13 the number of "1" states in the bit pattern of the ten (10) bits of the quiet state is verified, i.e. as to whether there is an even number of "1" states. If the verification at block S13 proves positive, i.e. there is an even number of "1" states in the bit pattern, and therefore the chip of memory 2 is in the active mode, the sequence is continued at a block S 14, where a next unprogrammed memory cell 3 or a next unprogrammed bit is established, which in a next block S15 is put or brought into a "1" state, so that memory 2 is in the quiet, state or an inactive state at a subsequent block S16.

If the verification at block S13 proves negative, the sequence is continued at block S16, because when there is an odd number of "1" states in the bit pattern, the quiet state or inactive state is already present.

FIG. 2 shows a portion of an integrated circuit 1, wherein the integrated circuit 1 comprises a memory 2 with a plurality of memory cells 3 that are programmable in an OTP process (see FIG. 3). Each memory cell 3 has a fuse 4 in addition to a resistance R, said fuse 4 burning through for a programming of the memory cell 3. A bit, i.e. a "1" state or a "0" state, can be determined or picked up at an output 5 of memory cell 3.

As well as memory 2, the integrated circuit 1 according to FIG. 2 contains an address decoder 6, in said address decoder 6 a logical memory address being assigned to a physical memory cell 3, a circuit 7 for the verification and encryption of data, which contains an encryption logic stage, and a programming device 8 for programming the plurality of memory cells 3 that are provided in memory 2, and which can be brought into an irreversible memory state by means of a programming step. Furthermore it contains a feed-logic circuit 9, into which at least one address can be entered in accordance with the indicated connection 10. A line 11 is also provided, for feeding a command for programming a memory cell 3. A serial output 12 is provided as a data output. A clock input 13 is also provided, for feeding a command for a relocation operation. The data required for programming the memory cell 3 can be supplied to the feed-logic circuit 9 via a line 14. Data required for a programming can be fed along line 15 from the feed-logic circuit 9 to the memory 2, verification of the memory address and allocation of the logical memory address to the physical memory cell 3 taking place over a line 16.

Figure 4:
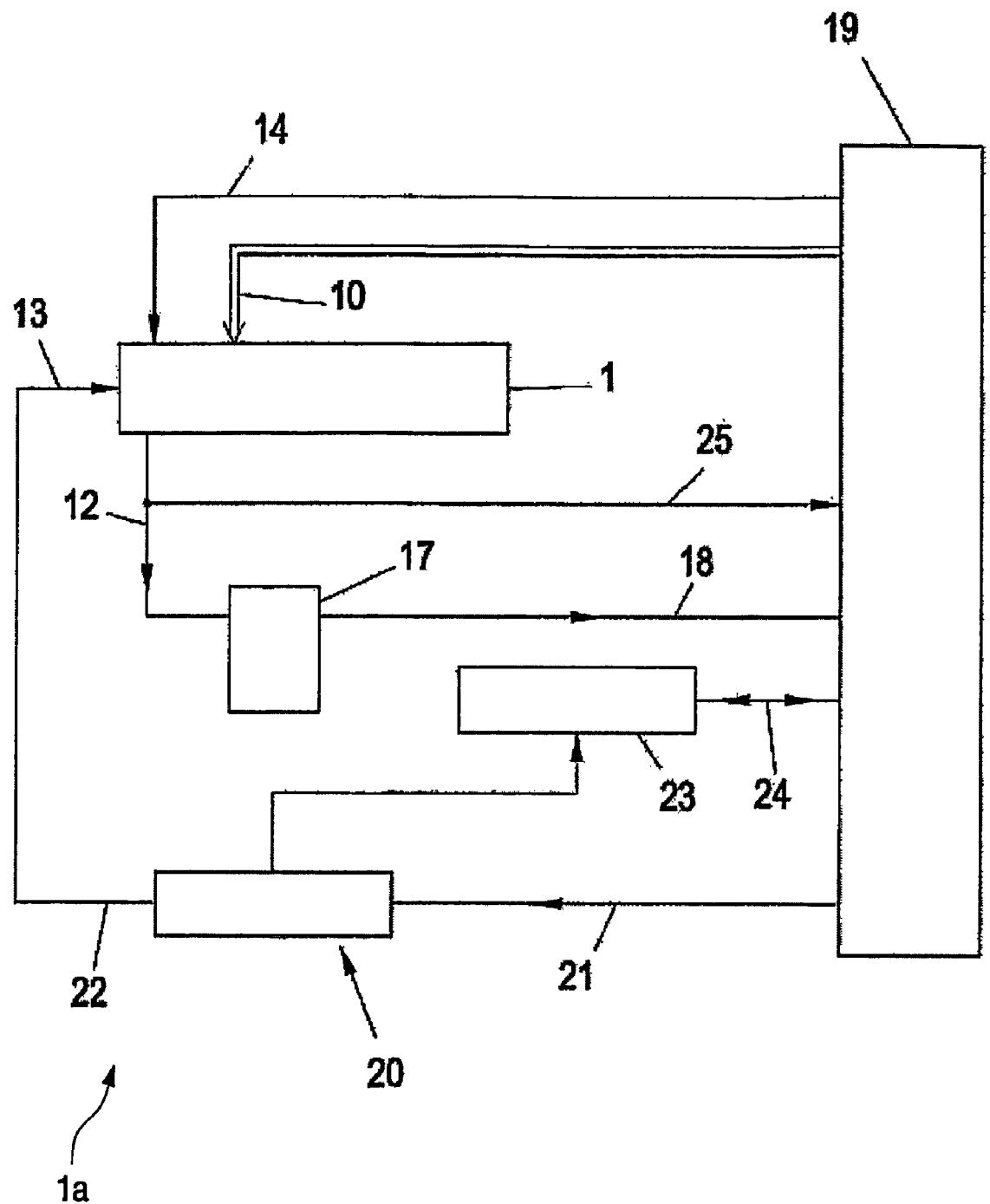
FIG. 4 shows schematically, in the form of a block diagram, a portion of an integrated circuit with which it is possible to set or program a memory cell after the state information of the memory according to FIG. 2 has been determined.

The block diagram according to FIG. 4 shows a portion of an integrated circuit 1a, explaining a determining of the state information of the memory state of memory 2 and a programming of a selected memory cell 3. The integrated circuit 1a contains the integrated circuit 1 according to FIG. 2 and accordingly the memory 2, which memory 2 contains a plurality (n) of memory cells 3. The serial output 12 of the feed-logic circuit is connected to a toggle flip-flop 17, which toggle flip-flop 17 serves for determining the number of programmed memory cells 3 that are in an irreversible memory state, i.e. the "1" state, and hence for determining the state information of memory 2. A result obtained from the toggle flip-flop 17 is fed via line 18 to a sequencing circuit 19 of integrated circuit 1a.

A counting stage 20 is also provided, to which a clock signal can be fed from a clock generator (not shown) and to which, via a line 21, a start-counting command and a stop-counting command can be fed from the sequencing circuit 19 and which delivers, via a line 22, a pulse-shaped shift signal (clock signal) to the clock input 13 of integrated circuit 1. The counting stage 20 serves for determining the position of a next unprogrammed memory cell 3, by counting the clock signals fed to it and—if a "0" state, i.e. a next unprogrammed memory cell 3 is determined-with the aid of the sequencing circuit 19, to which sequencing circuit 19 the data available at the serial output 12 of integrated circuit 1 are fed via line 25—is stopped by means of a counting stop command emitted by the sequencing circuit 19, and then the count contained in counting stage 20 represents the position of the next unprogrammed memory cell 3. For storing this count and hence the determined position of the next unprogrammed memory cell 3, a position memory 23 is provided, to which position memory 23 the count is fed over a line from the counting stage 20 and which is connected via a line 24 to the sequencing circuit 19, so that the sequencing circuit 19 can interrogate the stored count.

An address is fed to the integrated circuit 1 via connection 10 with the aid of the sequencing circuit 19, and additionally a command for programming a memory cell 3 is transferred via line 14.

As has already been mentioned several times above, apart from the elements shown in particular in FIG. 2, the integrated circuit 1 has at least one additional memory for storing preset data and/or data that can be entered via an input device (not shown), in order for example to make available a label or tag as data carrier for a product that is to be marked. Said storing of data for a product that is to be marked and a corresponding data carrier are described in the international patent application having application number IB03/01434 "Method of protecting from deactivation of an RFID-Transponder associated with a product", the disclosure of which is hereby incorporated by reference.

By providing the plurality of memory cells 3 or bits, each programmable once, according to the number of said memory cells 3 provided, a data carrier provided with the integrated circuit 1a can be shifted repeatedly into an inactive state or quiet state, in which quiet state the data carrier does not reply and cannot be read, and repeatedly into an active state or non-quiet state.

Provision of circuit 7 for the verification and encryption of data not only ensures verification of access authorization for changing the state information of memory 2, but it therefore additionally permits, if required, restricted access to the additional memory of integrated circuit 1a or of the data carrier for the storage of preset and/or enterable data.

Such restriction of access to data or reading of data contained in a data carrier is provided for example for the case where, following purchase, during servicing or complaint for example all data are made available, whereas during disposal of a product or object provided with a data carrier, only details relating to the manufacture and/or specific constituents are permitted to be read, whereas further details in connection with an acquisition of the product are not to be made known.

It may be mentioned that instead of the provision of two different states, as is provided in the case described above, in other cases for example three or more different states can be defined, and the reversible state information of the memory is determined by appropriately modified verification criteria similarly to blocks S3 or S13 in FIG. 1 just as in the case described above, and after the state information has been determined or established, there is again a selecting of an unprogrammed memory cell and a subsequent programming for changing the state information to a desired state.

It may further be mentioned that instead of a quiet state of a tag or label, the method according to the invention can for example also be used for a write-protect mode for a Smart Card. As in the embodiment described above in connection with a tag or label, in this case the state information of the memory is verified, and the state information of the memory can only be changed if there is an appropriate access authorization.

It may further be mentioned that in addition, the method according to the invention can for example be used for changing a regional code for a DVD player, with change of said regional code being limited to a small number, for example five (5) changes. These changes correspond in each case to changing the state information of a corresponding memory.

Furthermore, it may be mentioned that the method according to the invention for storing and/or changing state information of a memory containing a plurality of memory cells can be used as write protection for video cassettes.

The invention claimed is:

1. An integrated circuit for securing data stored in a data carrier comprising:
   a memory comprising a plurality of memory cells;
   a first logic circuit configured for determining a current state of the memory, wherein the current state of the memory is selected from the group consisting of an active state and a quiet state and wherein in the active state the data of the carrier is accessible and wherein in the quiet state the data of the carrier is inaccessible;

a feed-logic circuit, wherein the feed-logic circuit is configured for:
receiving state information indicative of a current state of a memory cell, wherein the current state of the memory cell is selected from the group consisting of a programmed state and an unprogrammed state; and
if the current state of the memory is the active state and if the current state of the memory cell is the unprogrammed state, then selecting the memory cell; and
issuing a programming command to a programming unit to program the selected memory cell to change the state of the memory cell to the programmed state, wherein the memory cell assumes an irreversible memory state as a result of the programming and wherein the memory enters the quiet state;
means for returning the memory back to the active state and then resetting the memory to the quiet state by changing the state of a next memory cell of the plurality of memory cells to the programmed state, wherein said next memory cell assumes an irreversible memory state as a result of the programming.

2. The integrated circuit according to claim 1 further comprising:
a counter; and
a sequencing circuit, wherein the sequencing circuit is configured for:
providing a clock signal to a clock input of the integrated circuit via the counter;
receiving a serial output from the integrated circuit indicative of the state of each of the plurality of memory cells; and
issuing a stop count signal to the counter when a first memory cell in the unprogrammed state is detected, and
wherein the counter is configured to count the clock signals to produce a count indicative of the location of the first memory cell in the unprogrammed state.

3. The integrated circuit according to claim 1 further comprising a verification circuit, wherein the verification circuit is configured for, prior to determination of the current state of the memory, verifying authorization to access the memory.

4. An integrated circuit according to claim 1, wherein the data stored in the data carrier is selected from the group consisting of preset data and data entered via an input device.

5. A data carrier comprising an integrated circuit according to claim 1.

6. A data carrier according to claim 5, wherein the data carrier is designed for contactless communication with a communication station.

7. A data carrier according to claim 5, wherein the data carrier is in the form of a tag or label.

8. The integrated circuit of claim 1, wherein the active state is associated with an even count of memory cells in the programmed state and wherein the first logic circuit is configured for:
determining a count of memory cells in the programmed state;
if the count of memory cells in the programmed state is even, then determining the current state of the memory to be the active state; and
if the count of memory cells in the programmed state is odd, then determining the current state of the memory to be the quiet state.

9. The integrated circuit of claim 1, wherein the active state is associated with an odd count of memory cells in the programmed state and wherein the first logic circuit is configured for:
determining a count of memory cells in the programmed state;
if the count of memory cells in the programmed state is odd, then determining the current state of the memory to be the active state; and
if the count of memory cells in the programmed state is even, then determining the current state of the memory to be the quiet state.

10. An integrated circuit for securing data stored in a data carrier comprising:
a memory comprising a plurality of memory cells;
a first logic circuit configured for determining a current state of the memory, wherein the current state of the memory is selected from the group consisting of an active state and a quiet state and wherein in the active state the data of the carrier is accessible and wherein in the quiet state the data of the carrier is inaccessible;
a feed-logic circuit, wherein the feed-logic circuit is configured for:
receiving state information indicative of a current state of a memory cell, wherein the current state of the memory cell is selected from the group consisting of a programmed state and an unprogrammed state; and
if the current state of the memory is the active state and if the current state of the memory cell is the unprogrammed state, then selecting the memory cell; and
issuing a programming command to a programming unit to program the selected memory cell to change the state of the memory cell to the programmed state, wherein the memory cell assumes an irreversible memory state as a result of the programming and wherein the memory enters the quiet state;
wherein the active state is associated with an even count of memory cells in the
programmed state and wherein the first logic circuit is configured for:
determining a count of memory cells in the programmed state;
if the count of memory cells in the programmed state is even, then determining the current state of the memory to be the active state; and
if the count of memory cells in the programmed state is odd, then determining the current state of the memory to be the quiet state.

11. An integrated circuit for securing data stored in a data carrier comprising:
a memory comprising a plurality of memory cells;
a first logic circuit configured for determining a current state of the memory, wherein the current state of the memory is selected from the group consisting of an active state and a quiet state and wherein in the active state the data of the carrier is accessible and wherein in the quiet state the data of the carrier is inaccessible;
a feed-logic circuit, wherein the feed-logic circuit is configured for:
receiving state information indicative of a current state of a memory cell, wherein the current state of the memory cell is selected from the group consisting of a programmed state and an unprogrammed state; and
if the current state of the memory is the active state and if the current state of the memory cell is the unprogrammed state, then selecting the memory cell; and
issuing a programming command to a programming unit to program the selected memory cell to change the state of the memory cell to the programmed state, wherein the memory cell assumes an irreversible memory state as a result of the programming and wherein the memory enters the quiet state;

wherein the active state is associated with an odd count of memory cells in the programmed state and wherein the first logic circuit is configured for:

determining a count of memory cells in the programmed state;

if the count of memory cells in the programmed state is odd, then determining the current state of the memory to be the active state; and if the count of memory cells in the programmed state is even, then determining the current state of the memory to be the quiet state.

* * * * *